(No Model.) G. W., J. R. & S. B. RUDE. 2 Sheets—Sheet 1.
GRAIN DRILL.
No. 253,891. Patented Feb. 21, 1882.
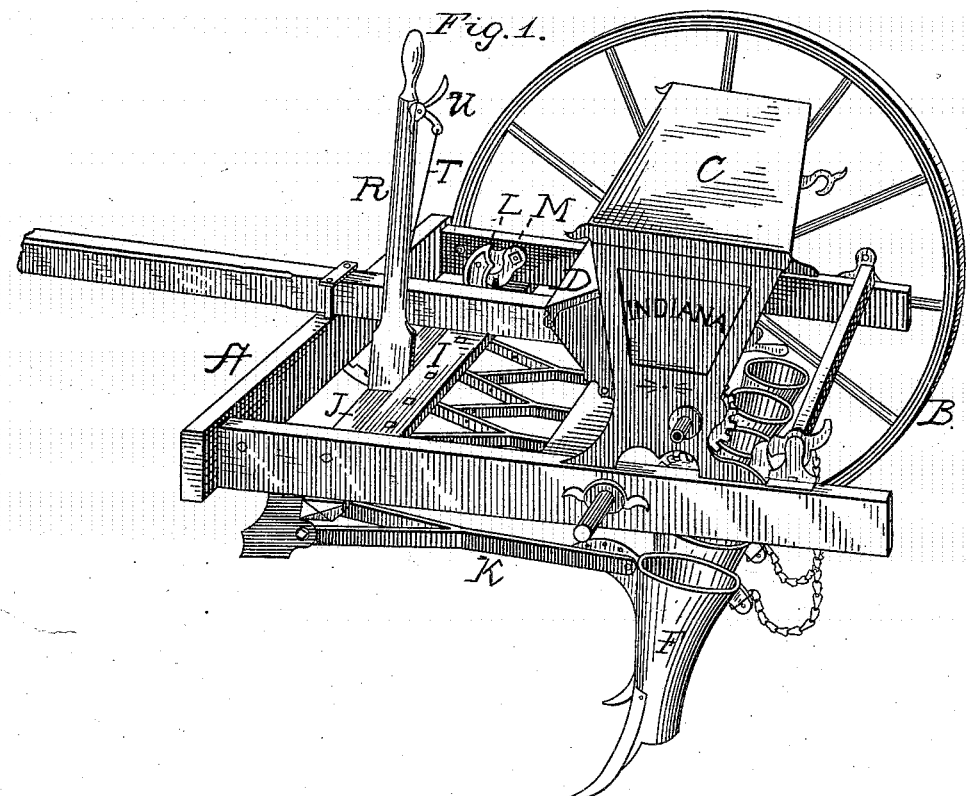
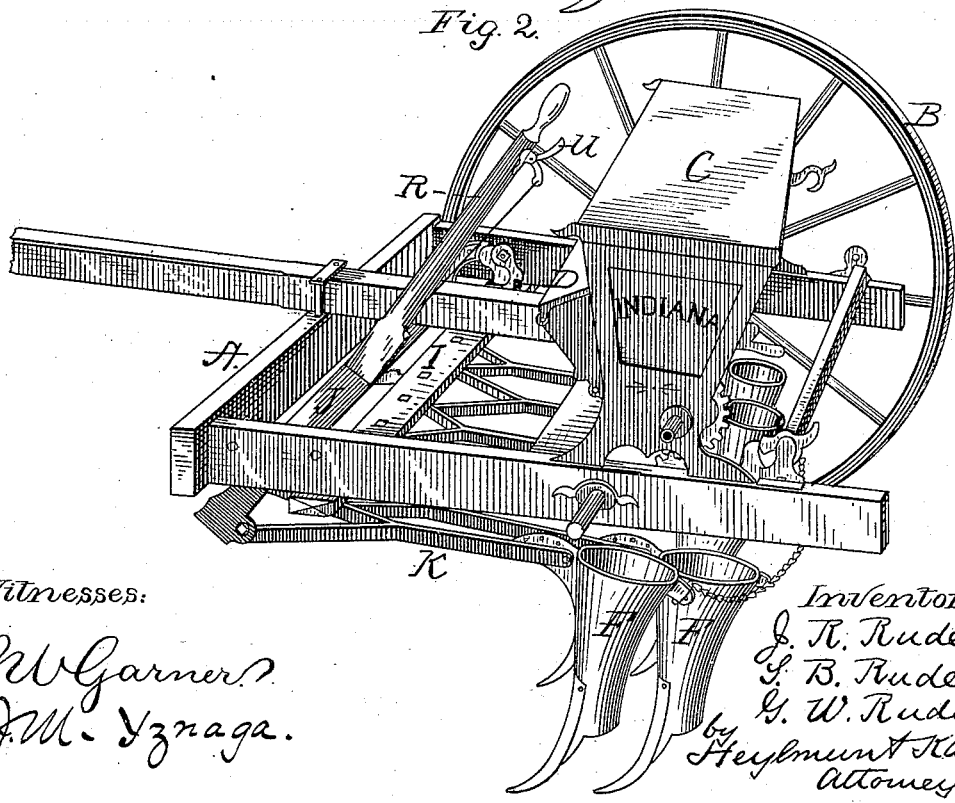

(No Model.)
G. W., J. R. & S. B. RUDE.
GRAIN DRILL.
No. 253,891. Patented Feb. 21, 1882.
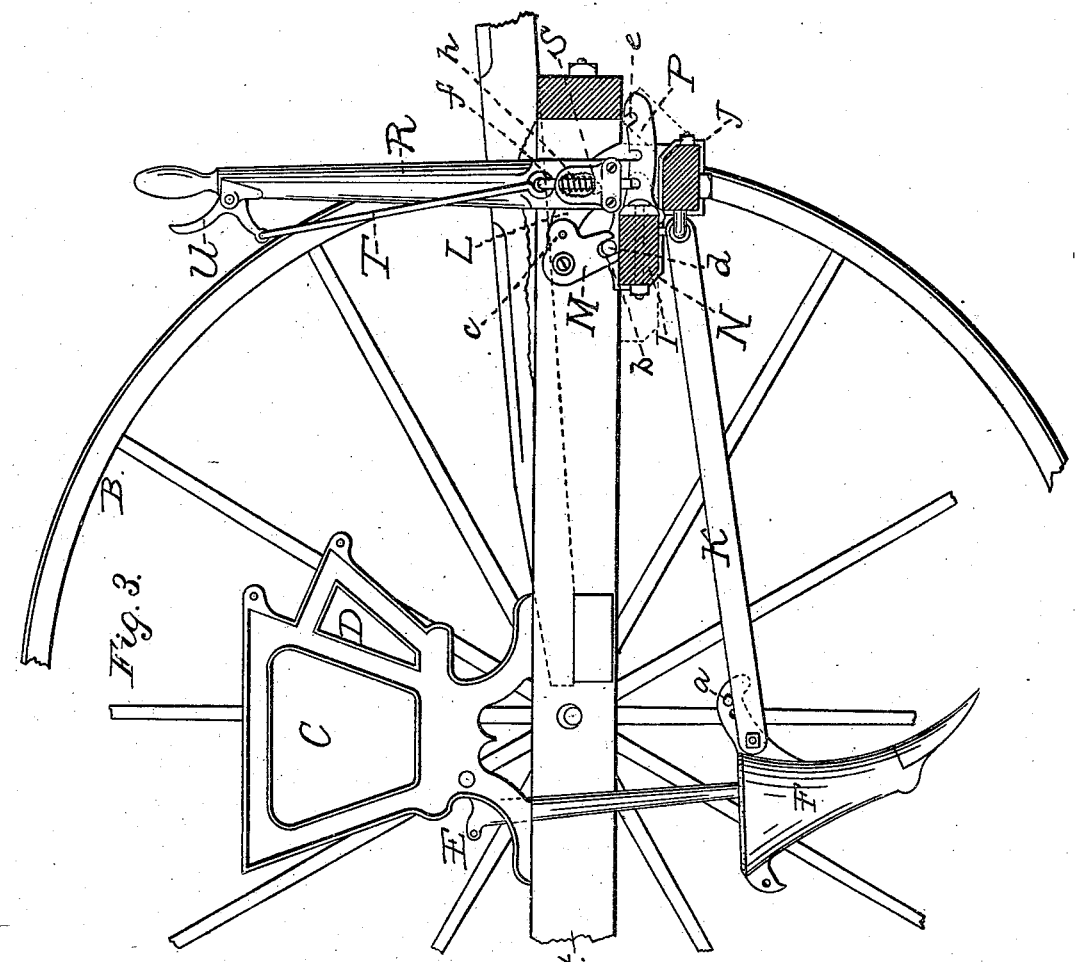

UNITED STATES PATENT OFFICE.

GEORGE W. RUDE, JOHN R. RUDE, AND SQUIRE B. RUDE, OF LIBERTY, IND.

GRAIN-DRILL.

SPECIFICATION forming part of Letters Patent No. 253,891, dated February 21, 1882.

Application filed September 9, 1881. (No model.)

*To all whom it may concern:*

Be it known that we, G. W. RUDE, J. R. RUDE, and S. B. RUDE, citizens of the United States of America, residing at Liberty, in the county of Union and State of Indiana, have invented certain new and useful Improvements in Grain-Drills; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of grain-drills in which the drag-bars with their hoes are attached alternately to transverse parallel bars arranged at the front part of the frame of the implement, and the hoes are capable of being shifted from a straight to a zigzag line, or vice versa, so as to form either a single or double rank of hoes.

Our invention consists in the transverse bars located at the front end of the frame, arranged in different horizontal planes, one of which has a novel movement—to wit, in the arc of a circle—and carrying drag-bars and hoes and mechanical means for actuating them in opposite directions for adjusting the hoes.

Our invention further consists in providing one of the transverse bars with an operating-lever and an automatic locking and a releasing device, in combination with the other transverse bar provided with a notch-segment.

Our invention further consists in the novel construction and combination of parts, as will be hereinafter more fully described, and pointed out in the claims.

In the accompanying drawings, Figure 1 represents a perspective view of a well-known grain-drill with the near wheel removed and having our improvements attached. Fig. 2 is a similar view of the machine, showing the hoes in double rank; and Fig. 3 is a sectional view of the machine, showing fully the shifting mechanism. Figs. 4 and 5 are detail views.

The letter A represents the frame-work of a well-known force-feed grain-drill mounted on supporting-wheels B, and carrying the seed-hopper C and the fertilizer-hoppers for discharging their materials into the conductor E, provided with the hose or tube communicating with the hoe F, substantially as shown in Fig. 3 of the drawings.

At the front end of the frame are suitably arranged the transverse shifting-bars I J in different horizontal planes, and to the rear portion of each are connected in the well-known manner the drag-bars K, carrying at their outer or extreme ends the pivoted hoes F, which are also sustained in position by means of wooden break-pins a, as shown.

At the outer ends of the front transverse bar J are firmly secured overhanging brackets L, which engage with the bell-crank levers M, attached to the inner surfaces of the side bars of the frame, so as to work on an axis, and each is formed with a slot, b, and pin c, as seen in Fig. 3 of the drawings. These bell-crank levers are arranged and journaled in such manner to the side bars of the frame that the pin or stud c of each lever will engage with an opening or its equivalent at the upper end of the curved arm L of the transverse bar J, and the slot b of each to engage with a stud or pin, d, arranged on the inner side of the cap-plates N, attached to the ends of the rear transverse bar, I, substantially as seen in the drawings. The relative order or arrangement of these transverse bars, termed "shifting-bars," should be such as not to interfere with their shifting movements in adjusting the hoes.

To the front face of the upper transverse bar, I, is secured, about midway of its length, a rack or curved arm, P, formed on its upper surface with a plurality of notches, e, for the purpose hereinafter described.

To the upper surface of the front transverse bar, J, about midway of its length and adjacent to the rack P, is secured firmly a lever, R, the side of which adjacent to the rack P is provided with a casing, S, containing a bolt, f, and a coiled spring, h, surrounding the same. The upper end of this bolt f is formed with a loop or other means, to which is attached a connecting-rod, T, attached to a fulcrum-lever, U, at the upper end of the handle R, as shown in the drawings.

The object of the casing S, with its adjuncts arranged over the rack or the notched arm P, is to thrust automatically the spring-bolt f into one of the notches of the rack and hold the hoes firmly in the single or double rank; also, these devices permit the zigzag order of the hoes to be greater or less, to suit the condition of the soil or rubbish on the field.

It will be observed, by reference to Figs. 1 and 2 of the drawings, that the drag-bars are alternately attached to the front and rear shifting-bars, (one half to the front and the other half to the rear shifting-bar,) and are of such length that when the drag-bars are close together, as seen in Fig. 1, the hoes will be in a single rank to be shifted to a double rank.

To change the hoes from a single rank or a straight line to a zigzag or double rank, as seen in Fig. 2, the lever R and the fulcrum-lever U are grasped by the driver on the machine, and by drawing the upper portion of the lever U inward to the lever R, so as to assume a vertical line, or nearly so, the connecting-rod T withdraws the spring-bolt $f$ from its notch in the rack, and when so released the lever R, with its attachments, is drawn inward, thus shifting the front transverse bar, J, forward and upward in the arc of a circle and the rear transverse bar, I, backward in a horizontal direction, thereby shifting the order of the hoes alternately, in which position they are locked by the driver removing his hand, and the spring-bolt dropping automatically into the recess or notch of the rack-bar immediately under.

The advantages of ranking the hoes are well known to those skilled in the art, and it is not deemed essential to repeat them herein; but the employment of a locking device, and especially one of the automatic class, is important, since the hoes are locked in their position and displacement of the ranks prevented. The automatic adjustment is accomplished without the driver leaving his seat.

We reserve the right to vary the construction of the shifting mechanism and the castings without departing from the spirit of the invention hereinbefore described.

It is obvious that our improvements are applicable to seeding-machines of a different construction.

What we claim as our invention, and desire to secure by Letters Patent, is—

1. In a grain-drill, a shifting-bar having attached thereto directly an operating-lever arranged at the front end of the frame and means for actuating a spring-bolt, in combination with a parallel transverse shifting-bar provided with a rack to receive the spring-bolt of the lever, substantially as described.

2. In a grain-drill, the combination of two parallel shifting-bars, one of which is provided with a curved bar having a plurality of notches, and the other provided with a hand-lever and an automatic spring-bolt for engaging with the notches of the curved bar, to secure a lock, substantially as described.

3. In a grain-drill, the combination of two parallel shifting-bars arranged in different horizontal planes, whereby one of the bars has in its shifting movement a compound motion, as described, and for the purpose set forth.

4. In a grain-drill, the rear shifting-bar provided with the notched curved arm and the front shifting-bar provided with the hand-lever and side casing containing a spring-bolt, with means for withdrawing the bolt from its engagement, substantially in the manner as described.

5. In a grain-drill, the combination, with the operating-lever R, of the bell-crank lever M, connecting-rod T, and spring-bolt $f$, inclosed in a casing, substantially as described.

In testimony whereof we affix our signatures in presence of two witnesses.

GEORGE W. RUDE.
JOHN R. RUDE.
SQUIRE B. RUDE.

Witnesses:
GEO. BUTLER,
JAMES J. MILLER.